United States Patent
Chen et al.

(10) Patent No.: US 10,310,860 B2
(45) Date of Patent: Jun. 4, 2019

(54) STARTING AND STOPPING INSTRUCTION DISPATCH TO EXECUTION UNIT QUEUES IN A MULTI-PIPELINE PROCESSOR

(71) Applicant: International Business Machines Corporation, Armonk, NY (US)

(72) Inventors: Wen-Tzer T. Chen, Austin, TX (US); Diane G. Flemming, Pflugerville, TX (US); Sandy K. Kao, Austin, TX (US); William A. Maron, Austin, TX (US); Mysore S. Srinivas, Austin, TX (US); Donald R. Stence, Pflugerville, TX (US); Calvin L. Sze, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 15/224,213

(22) Filed: Jul. 29, 2016

(65) Prior Publication Data
US 2018/0032343 A1 Feb. 1, 2018

(51) Int. Cl.
*G06F 9/30* (2018.01)
*G06F 9/38* (2018.01)

(52) U.S. Cl.
CPC .......... *G06F 9/3836* (2013.01); *G06F 9/3814* (2013.01); *G06F 9/3889* (2013.01)

(58) Field of Classification Search
CPC ..... G06F 9/3814; G06F 9/3836; G06F 9/3885
See application file for complete search history.

(56) References Cited

U.S. PATENT DOCUMENTS

| | | | |
|---|---|---|---|
| 7,636,836 B2 | 12/2009 | Nemirovsky et al. | |
| 8,566,568 B2 | 10/2013 | Michalak et al. | |
| 9,417,920 B2* | 8/2016 | Tran | G06F 9/5011 |
| 2012/0173853 A1* | 7/2012 | Ukai | G06F 9/30141 |
| | | | 712/220 |
| 2014/0176586 A1* | 6/2014 | Gruber | G06F 12/0607 |
| | | | 345/533 |

(Continued)

FOREIGN PATENT DOCUMENTS

| | | |
|---|---|---|
| CN | 101034345 A | 9/2007 |
| CN | 101706714 B | 3/2014 |
| IN | 2014CH00859 A | 4/2015 |

OTHER PUBLICATIONS

English Abstract for Chinese Patent No. CN101034345A, Sep. 12, 2007.

(Continued)

*Primary Examiner* — David J. Huisman
(74) *Attorney, Agent, or Firm* — Martin & Associates, LLC; Bret J. Petersen

(57) ABSTRACT

A system and method adjust instruction dispatch in a multi-pipeline processor core having a plurality of execution units for improved performance of out-of-order execution of instructions. A dispatch adjust circuit receives a queue full signal from one or more of the execution queues that indicates the corresponding execution queue is full. In response to the queue full signal, the instruction dispatch circuit sends a stop signal to the instruction issuer to stop issuing additional instructions to the queues until one or more of the queues are empty. The dispatch adjust circuit may also receive a queue empty signal from the queues to detect when they are empty to send a start signal to the issuer.

11 Claims, 5 Drawing Sheets

(56) References Cited

U.S. PATENT DOCUMENTS

2014/0282575 A1    9/2014   Chan

OTHER PUBLICATIONS

English Abstract for Chinese Patent No. CN101706714, Mar. 26, 2014.
English Abstract for India Patent Application Publication No. 2014CH00859, Apr. 24, 2015.
Boumoutian et al., "Mobile Ecosystem Driven Dynamic Pipeline Adaptation for Low Power", Architecture of Computing Systems—ARCS 2015, pp. 83-95, (2015).
Zhang et al., "Recalling instructions from idling threads to maximize resource utilization for simultaneous multi-threading processors", Computers & Electrical Engineering, 39(7), pp. 2031-2044, (2013).

* cited by examiner

FIG. 2A
(1) r1 <= r4 / r7
(2) r8 <= r1 + r2
(3) r5 <= r5 + 1
(4) r6 <= r6 − r3
(5) r4 <= r5 + r6
(6) r7 <= r8 * r4
FIG. 2B
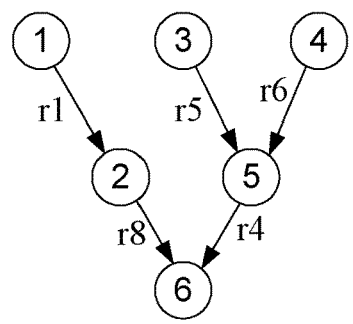
FIG. 2C
In-Order Execution
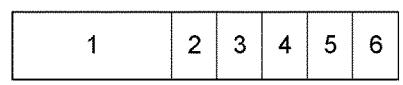
FIG. 2D
Out-of-Order Execution
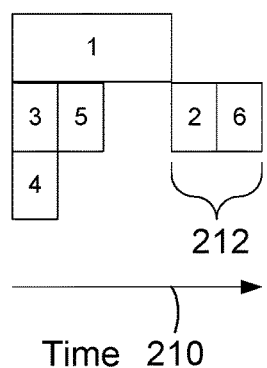
212
Time 210

STARTING AND STOPPING INSTRUCTION DISPATCH TO EXECUTION UNIT QUEUES IN A MULTI-PIPELINE PROCESSOR

BACKGROUND

1. Technical Field

This disclosure generally relates to out-of-order execution of instructions in a computer processing unit, and more specifically relates to a system and method for adjusting instruction dispatch in a multi-pipeline processor for improved performance of out-of-order execution of instructions.

2. Background Art

General purpose computers execute programs which are represented in executable form as ordered sequences of machine instructions. Typically, computer programs are designed to be executed in sequential order. However, modern processor design techniques seek to exploit opportunities for concurrent execution of machine instructions, i.e., instruction parallelism. Superscalar techniques can be used to increase instruction parallelism by mapping instructions to multiple execution units. Superscalar techniques include out-of-order instruction issue and out-of-order instruction completion. A superscalar processor which exploits out-of-order issue need only be constrained by dependencies between the output (results) of a given instruction and the inputs (operands) of subsequent instructions in formulating its instruction dispatch sequence. Out-of-order completion, on the other hand, is a technique which allows a given instruction to complete (e.g., store its result) prior to the completion of an instruction which precedes it in the program sequence.

Executing instructions out of sequential order can increase a superscalar processor's performance by allowing the superscalar processor to keep multiple execution units operating in parallel thereby improving throughput. Accordingly, a dispatcher for a superscalar processor can improve overall performance by determining which instructions can be executed out-of-order and providing, or dispatching, those instructions to appropriate pipelines for execution units. The instructions in an execution pipe of a processing unit core sometimes cannot be executed quickly where the needed resources are occupied by previous groups of instructions. The current instructions queued in the execution pipe further delaying additional instructions being dispatched. This effect ripples through every stage of instruction execution causing long delays in the execution of the software.

BRIEF SUMMARY

The disclosure and claims herein relate to a system and method having a plurality of execution units for improved performance of out-of-order execution of instructions. A dispatch adjust circuit receives a queue full signal from one or more the execution queues that indicates the execution queue is full. In response to the full queue signal, the instruction dispatch circuit sends a stop signal to the instruction issuer to stop issuing additional instructions to the queues until one or more of the queues are empty. The dispatch adjust circuit may also receive a queue empty signal from the queues to detect when they are empty to send a start signal to the issuer.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIGS. 2A-2D illustrate a simple example of machine code and how the code can be executed in order and alternatively how the code can be executed out of order;

DETAILED DESCRIPTION

The disclosure and claims herein relate to a system and method for adjusting instruction dispatch in a multi-pipeline processor core having a plurality of execution units for improved performance of out-of-order execution of instructions. A dispatch adjust circuit receives a queue full signal from one or more of the execution queues that indicates the execution queue is full. In response to the full queue signal, the instruction dispatch circuit sends a stop signal to the instruction issuer to stop issuing additional instructions to the queues until one or more of the queues are empty. The dispatch adjust circuit may also receive a queue empty signal from the queues to detect when they are empty to send a start signal to the issuer.

Figure 1:
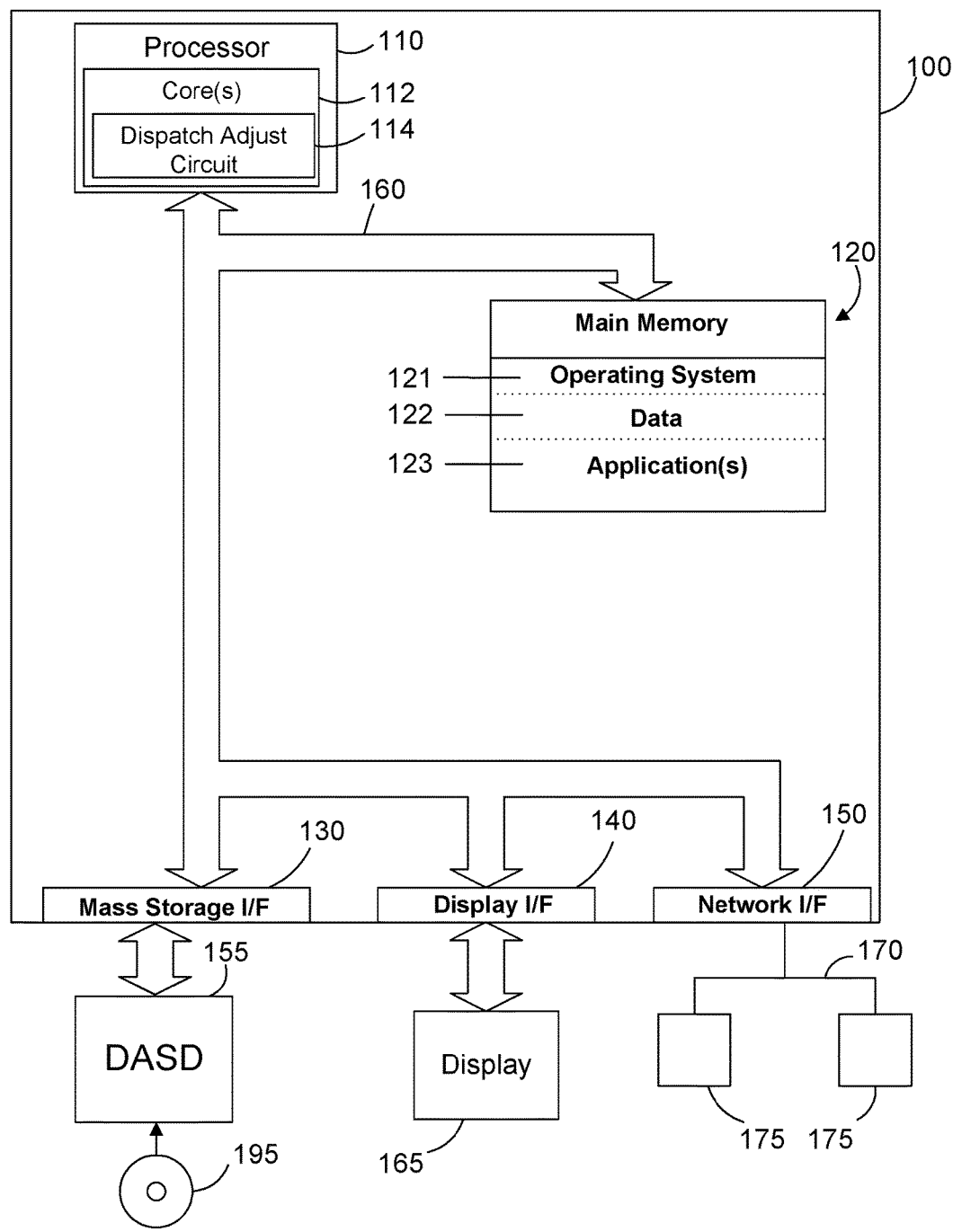
FIG. 1 is a block diagram a computer system with a dispatch adjust circuit as described herein to adjust instruction dispatch in a multi-pipeline processor core for improved execution performance.

Referring to FIG. 1, a computer system 100 is one suitable implementation of a computer system that is capable of performing the computer operations described herein. The computer system 100 includes a dispatch adjust circuit 114 for adjusting instruction dispatch the processor core 112 for improved execution performance as described herein. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110 with one or more cores 112. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as direct access storage devices 155, to computer system 100. One specific type of direct access storage device 155 is a readable and writable CD-RW drive, which may store data to and read data from a CD-RW 195.

Some devices may have a removable memory card or similar for a direct access storage device 155 instead of the CD-RW drive.

Main memory 120 preferably contains an operating system 121. Operating system 121 is a multitasking operating system known in the industry as IBM i; however, those skilled in the art will appreciate that the spirit and scope of this disclosure is not limited to any one operating system. The memory 120 further includes data 122 and one or more application programs 123.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while operating system 121, data 122, and application(s) 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up applications 123 under control of the operating system 121.

Although computer system 100 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIGS. 2A-2D illustrate a simple example of machine code executed in order and alternatively how the same machine code can be executed out of order. FIG. 2A illustrates six instructions of machine code with each line identified by a line number in parenthesis at the left of the instruction. The machine code is shown in a simplified syntax for illustration purposes. For this example there are eight registers available to the processor core identified as r1 through r8. Each of the instructions executes an operation on one or more of these registers. For example, line (1) is an instruction to load register r1 with the contents of register r4 divided by the contents of register r7.

FIG. 2B illustrates a dependency flow diagram for the machine code example shown in FIG. 2A. In FIG. 2B each circled number represents a line of machine code as shown in FIG. 2A. The arrows between the circled numbers represent dependency flow of data need by a line of machine code. The register identifiers between the circled numbers indicate a register resource that is needed by the line of machine code that precedes it. For example, line 1 needs the resource of register r1 that is also used in line 2 of the machine code. This dependency is indicated by the arrow from line 1 to line 2 and the resource r1 shown next to the arrow. Similarly, line 2 of the code depends on line 6 of the code that modifies r8. This dependency is indicated by the arrow from line 2 to line 6. It can be readily determined by the dependency graph that lines 2 and 6 of the code cannot be executed until after the completion of line 1 because they depend on a resources (r1) that is modified by line 1. In a similar manner the dependencies of each of the lines of code in FIG. 2A are shown in the dependency graph of FIG. 2B. These dependencies are used to determine the out-of-order execution as show in FIG. 2D and described below.

FIG. 2C illustrates in-order execution of the machine code example shown in FIG. 2A. In-order execution is the simplest case and has been used in many computer processors for many years. In order execution of the code example shown in FIG. 2A is simply the sequence of lines 1 through 6 as shown in FIG. 2C. Line 1 is shown with a larger box to indicate it takes more time to execute a divide instruction compared to the other instructions.

FIG. 2D illustrates out-of-order execution of the machine code example shown in FIG. 2A. Out-of-order execution was developed to increase the speed of execution by attempting to execute lines of code simultaneously in multiple execution units. In FIG. 2D, lines of code from FIG. 2A are shown divided into three groups for three execution units. Lines 1, 3 and 4 can begin execution simultaneously as determined by the dependency chart shown in FIG. 2B. Lines of code that can be initially executed are shown at the left. Elapsed time is shown moving to the right as indicated by the arrow 210. When line 1 is finished executing, line 2 can then begin execution followed by line 6 as shown at 212. By executing instructions in parallel, the out-of-order execution of the instructions shown in FIG. 2D completes faster than the in-order execution of the instructions shown in FIG. 2C.

FIG. 2D illustrates a problem associated with out-of-order execution. In the simple example, line 2 and line 6 are not able to execute until line 1 is finished because line 2 is waiting for the resource r1 which is tied up by the calculation in line 1. The illustrated example is significantly simplified. In contrast, in a real processing situation the dependencies will build up and completely fill the instruction queues. Later instructions are waiting on instructions earlier in the queue to be executed. It was discovered and verified through testing that clearing the full queues by letting the instructions in the queues completely finish before adding additional instructions avoids further conflicts for these earlier resources. Letting the queues clear by not issuing more instructions to the queues was shown to have improved performance over continuing to keep the queues full. A stop signal can be sent to tell the issuer to stop issuing instructions to the instruction queues when one or more of the queues are full. The instruction queues will then start to clear out as instructions are executed. When one or more of the queues becomes completely empty the instruction dispatch circuit can instruct the issuer to start again issuing instructions to the queues.

Figure 3:
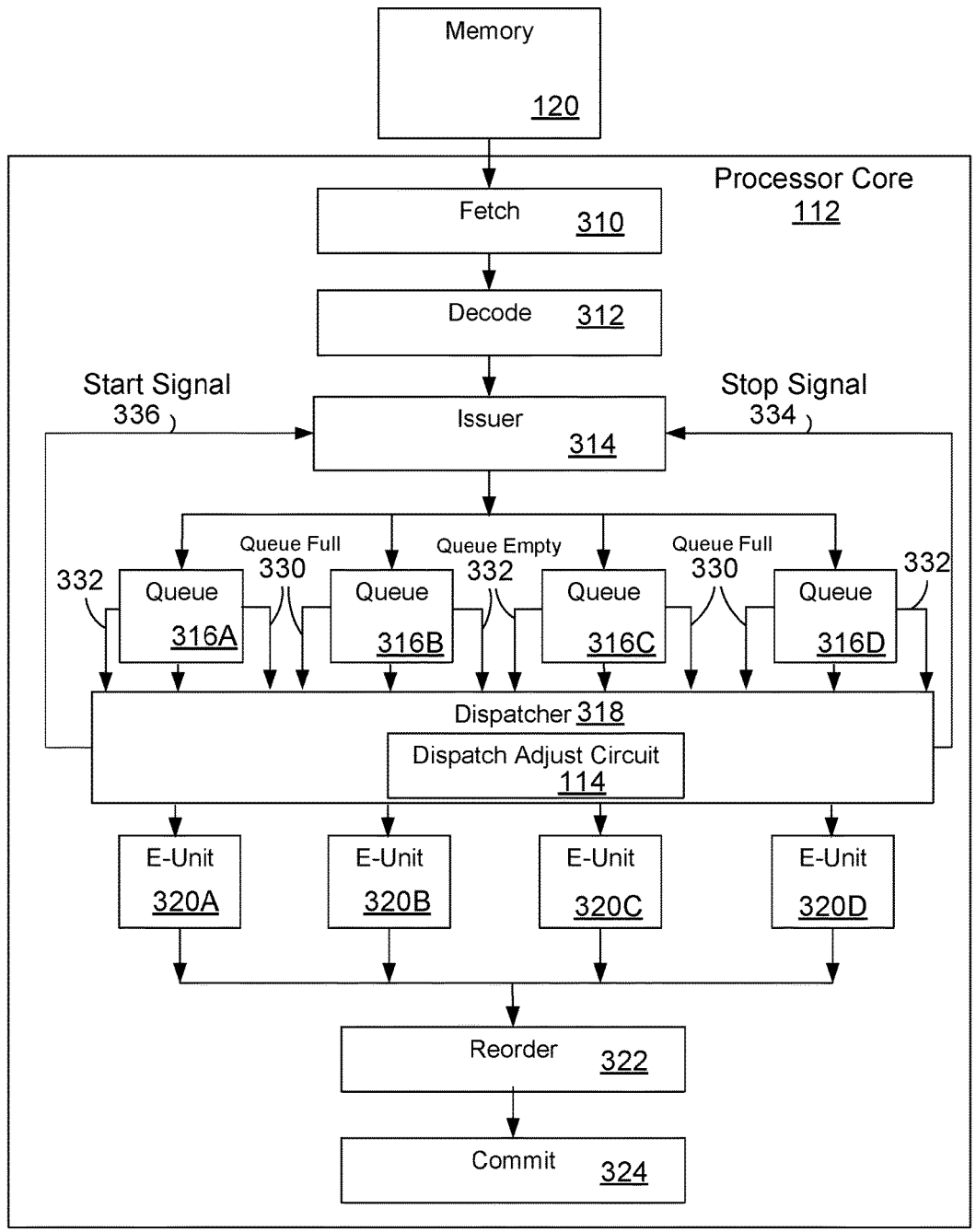
FIG. 3 is a simplified block diagram of a processor core with a dispatch adjust circuit as described herein to adjust instruction dispatch in a multi-pipeline processor core for improved execution performance.

FIG. 3 is a simplified block diagram of a processor core 112 connected to a memory 120. The processor core 112 includes a dispatch adjust circuit 114 as described herein to adjust instruction dispatch in a multi-pipeline processor core for improved execution performance. The architecture of the processor core shown in FIG. 3 is similar to prior art multi-pipeline processor cores that use out-of-order execution except for the additional features described herein. These additional features include the dispatch adjust circuit 114, its associated signals and the operation of the dispatcher 318 and the issuer 314 as described further below.

Again referring to FIG. 3, the processor core 112 has a fetch block 310 that fetches instructions from memory 120 introduced in FIG. 1. Alternatively, the memory 120 may include one or more levels of cache memory that are not shown. Portions of the cache memory may be located on the processor core 112 as known in the prior art. The fetch block 310 passes instructions to a decode block 312 that decodes the instructions for execution. The decode block 312 sends the decoded instructions to the issuer 314. The issuer 314 determines which instruction queue 316 should receive the decoded instructions. In this example there are four instruction queues 316A-316D, which are collectively referred to as instruction queues 316. A dispatcher 318 controls the flow of the instructions from the queues 316 to the execution units 320A-320D. The execution units 320A-320D may be designed to handle specific types of instructions as known in the prior art. For example, one or more execution units may be configured to handle floating point instructions, fixed point instructions or simple arithmetic instructions. The instruction units 320A-320D output the results of the executed instruction to a reorder block 322. The reorder block puts the executed instructions back in proper sequence. The commit block 324 holds instructions and then commits an instruction only after all previous instructions for the instruction are complete and have been committed in the manner known in the prior art.

In the example shown in FIG. 3, the dispatch adjust circuit 114 is incorporated into the dispatcher 318. The dispatch adjust circuit 114 adjusts instruction dispatch in the processor core 112 for improved out-of-order execution performance as described herein. The dispatch adjust circuit 114 receives a queue full signal 330 from each of the queues 316. The queue full signal 330 indicates the corresponding queue is full and can no longer accept additional instructions. The dispatch adjust circuit 114 may also receive a queue empty signal 332 from each of the queues 316. The queue empty signal 332 indicates the corresponding queue is empty. In response to the queue full signals 330, the dispatch adjust circuit 114 sends a stop signal 334 to the issuer 314 to direct the issuer to stop sending additional instructions to the queues 316 until one or more of the queues is completely empty. In response to the queue empty signals 332, the dispatch adjust circuit 114 sends a start signal 336 to the issuer 314 to direct the issuer to start again to send instructions to the queues 316.

With multiple queues as disclosed herein the dispatch adjust circuit can function based on the state of one queue, multiple queues, or all queues. For example, the dispatch adjust circuit 114 could send the stop signal 334 when a queue full signal 330 is received from any one of the queues 316. In the alternative, the dispatch adjust circuit 114 could send the stop signal 224 when a queue full signal 330 is received from multiple queues 316, which may include multiple specific queues 316. Of course, the dispatch adjust circuit 114 could wait to send the stop signal 224 when all queues 316 are full. In addition, the dispatch adjust circuit 114 could send the start signal 336 when only one of the queues 316 is empty. In the alternative, the dispatch adjust circuit 114 could send the start signal 336 when multiple queues 316 are empty, which may include multiple specific queues 316. Of course, the dispatch adjust circuit 114 could also wait to send the start signal 336 until all of the queues 316 are empty. These and other variations are within the scope of the disclosure and claims herein.

As described above, in the example shown in FIG. 3 the dispatch adjust circuit is incorporated into the dispatcher 318. Alternatively, the dispatch adjust circuit 114 and its corresponding functionality described herein could be incorporated into the issuer 314 to improve out-of-order execution performance.

Figure 4:
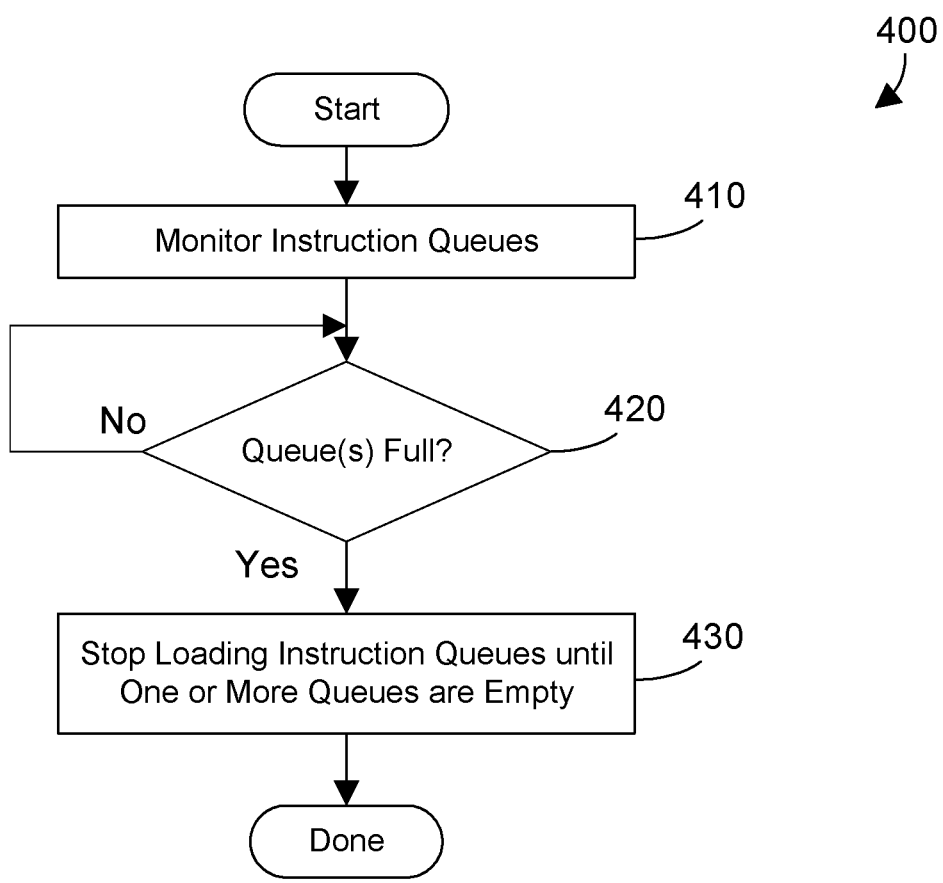
FIG. 4 is a flow diagram of a method for adjusting instruction dispatch in a multi-pipeline processor core.

Referring to FIG. 4, a method 400 shows one suitable example for a flow diagram of a method for adjusting instruction dispatch in a multi-pipeline processor core. All or portions of method 400 are preferably performed by the dispatch adjust circuit 114 shown in FIG. 1. Alternatively, the method may be incorporated into the issuer 314 shown in FIG. 3. First, monitor the instruction queues to determine when they are full (step 410). Next, if the queues (or at least one of the queues) are not full (step 420=no) then return to step 420. If one or more of the queues are full (step 420=yes) then stop loading instruction queues until one or more of the queues are empty (step 430). Method 400 is then done.

Figure 5:
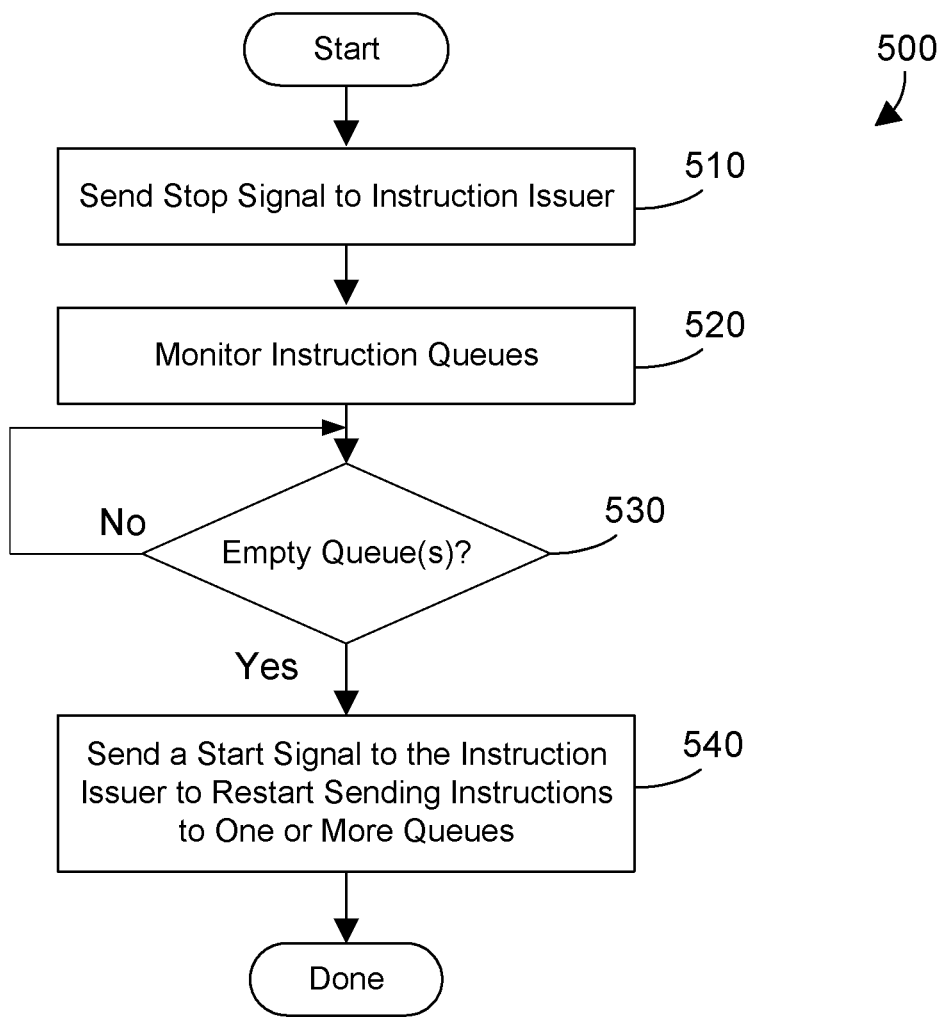
FIG. 5 is a flow diagram of a specific method for step 430 in FIG. 4.

FIG. 5 shows one suitable example of a method 500 to stop loading instruction queues until they are empty. Method 500 thus shows a suitable method for performing step 430 in method 400 in FIG. 4. First, send a stop signal to the instruction issuer to stop sending instructions to the instruction queues (step 510). Then monitor the instruction queues (step 520) to determine if one or more of the queues are empty (step 530). If the one or more queues are not empty (step 530=no) then return to step 530. If one or more of the queues are empty (step 530=yes) then send a start signal to the instruction issuer to restart sending instructions to one or more of the queues (step 540). The method 500 is then done.

The disclosure and claims herein relate system and method for adjusting instruction dispatch in a multi-pipeline processor core for improved out-of-order execution performance. A dispatch adjust circuit receives a queue full signal from one or more execution queues that indicates the execution queue is full and in response to the full queue signal, the instruction dispatch circuit sends a stop signal to the instruction issuer to stop issuing additional instructions to the queues until one or more of the queues are empty.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer processor core comprising:
an issuer for issuing decoded instructions;
a plurality of queues that receive the decoded instructions from the issuer;

a dispatcher that dispatches the decoded instructions from the plurality of queues to a plurality of execution units; and a dispatch adjust circuit that receives queue full signals comprising a queue full signal from each of the plurality of queues and in response to the queue full signals sends a stop signal;

wherein the issuer, in response to the stop signal, stops sending decoded instructions to the plurality of queues; and wherein the dispatch adjust circuit further receives queue empty signals comprising a queue empty signal from each of the plurality of queues, and in response to the queue empty signals indicating all of the plurality of queues are empty, sends a start signal to restart sending decoded instructions to the plurality of queues.

2. The computer processor core of claim 1 wherein the dispatch adjust circuit is in the dispatcher.

3. The computer processor core of claim 1 wherein the dispatch adjust circuit is in the issuer.

4. The computer processor core of claim 1 wherein the processor core is one of a plurality of processor cores integrated into a single integrated circuit processor chip.

5. The computer processor core of claim 1 wherein the processor core comprises a multi-pipeline processor core with out-of-order execution of instructions.

6. A method for issuing instructions in a computer processor core, the method comprising:

monitoring a plurality of queues being loaded with decoded instructions;

determining when at least one of the plurality of queues is full;

when the at least one of the plurality of queues is full, stopping loading the plurality of queues by sending a stop signal to an instruction issuer to stop issuing instructions;

monitoring the plurality of queues for emptiness;

determining when the plurality of queues is empty; and when the plurality of queues is empty, sending a start signal to restart sending instructions to the plurality of queues.

7. The method of claim 6 wherein the stop signal is sent when all of the plurality of queues are full.

8. The method of claim 6 wherein the steps are performed by a dispatch adjust circuit in an instruction issuer in the computer processor core.

9. The method of claim 6 wherein the steps are performed by a dispatch adjust circuit in an instruction dispatcher in the computer processor core.

10. The method of claim 6 wherein the computer processor core is one of a plurality of processor cores integrated into a single integrated circuit processor chip.

11. The method of claim 6 wherein the computer processor core comprises a multi-pipeline processor core with out-of-order execution of instructions.

* * * * *